United States Patent
Hanny et al.

(10) Patent No.: US 10,926,444 B2
(45) Date of Patent: Feb. 23, 2021

(54) ASSEMBLY FOR MANUFACTURING A TURBINE ENGINE BLADE

(71) Applicants: Safran Aircraft Engines, Paris (FR); Safran, Paris (FR)

(72) Inventors: Jean-Claude Marcel Auguste Hanny, Moissy-Cramayel (FR); Pascal Francis Patrick Gomez, Moissy-Cramayel (FR); Daniel Quach, Moissy-Cramayel (FR); Adrien Bernard Vincent Rollinger, Moissy-Cramayel (FR); Joseph Toussaint Tami Lizuzu, Moissy-Cramayel (FR); Matthieu Jean Luc Vollebregt, Moissy-Cramayel (FR)

(73) Assignees: Safran, Paris (FR); Safran Aircraft Engines, Paris (FR)

( * ) Notice: Subject to any disclaimer, the term of this patent is extended or adjusted under 35 U.S.C. 154(b) by 136 days.

(21) Appl. No.: 15/963,481

(22) Filed: Apr. 26, 2018

(65) Prior Publication Data

US 2018/0311876 A1 Nov. 1, 2018

(30) Foreign Application Priority Data

Apr. 28, 2017 (FR) ...................................... 1753820

(51) Int. Cl.
*B29C 45/36* (2006.01)
*B22C 7/02* (2006.01)
(Continued)

(52) U.S. Cl.
CPC ................ *B29C 45/36* (2013.01); *B22C 7/02* (2013.01); *B22C 9/10* (2013.01); *B22C 9/108* (2013.01);
(Continued)

(58) Field of Classification Search
CPC ........... B22C 9/10; B22C 13/12; B22C 21/14; B22C 9/103; B22C 9/18; B22C 9/24;
(Continued)

(56) References Cited

U.S. PATENT DOCUMENTS 4,379,688 A * 4/1983 Tate ...................... B29C 49/063
264/532
2005/0266111 A1* 12/2005 Ciccone .............. B29C 45/2675
425/192 R (Continued)

FOREIGN PATENT DOCUMENTS

FR 2 874 186 A1 2/2006
FR 2 875 425 A1 3/2006

*Primary Examiner* — Alison L Hindenlang
*Assistant Examiner* — Olukorede Esan
(74) *Attorney, Agent, or Firm* — Blank Rome LLP

(57) ABSTRACT

An assembly for manufacturing a wax moulding of a turbine engine blade has a wax injection mould in which a core is able to be mounted in a predetermined moulding position, the core including a main element and at least a first secondary element each including at least one functional part and a non-functional part, wherein the non-functional part of the first secondary element includes a rod portion extending in a longitudinal direction of the blade and housed in a first slot of the non-functional part of the main member, the mould including a first internal boss clamping said rod portion at the bottom of the first slot.

9 Claims, 1 Drawing Sheet

(51) Int. Cl.
  *B29C 67/24* (2006.01)
  *B22C 21/14* (2006.01)
  *B22C 9/10* (2006.01)
  *B29K 91/00* (2006.01)
  *F01D 5/14* (2006.01)

(52) U.S. Cl.
  CPC ............ *B22C 21/14* (2013.01); *B29C 67/241* (2013.01); *F01D 5/14* (2013.01); *B29K 2091/00* (2013.01)

(58) Field of Classification Search
  CPC ........... B22C 9/108; B22C 7/02; B29C 45/36; B29C 67/241; F01D 5/14
  See application file for complete search history.

(56) References Cited

U.S. PATENT DOCUMENTS

| | | | |
|---|---|---|---|
| 2006/0249275 A1* | 11/2006 | Judet | B29C 67/241 164/516 |
| 2013/0333855 A1 | 12/2013 | Merrill et al. | |
| 2015/0122445 A1* | 5/2015 | Truelle | B22C 9/103 164/15 |

* cited by examiner

ASSEMBLY FOR MANUFACTURING A TURBINE ENGINE BLADE

CROSS-REFERENCE TO RELATED APPLICATIONS

This application claims the benefit of French Patent Application No. 1753820, filed Apr. 28, 2017, the contents of which are incorporated herein by reference.

TECHNICAL FIELD

This invention relates to a method for determining the position of a core in an injection mould, particularly a wax injection mould. This method is intended for manufacturing turbine engines parts, such as turbine blades.

BACKGROUND

Traditionally, the lost-wax casting technique consists in first creating a model made of wax, or any other material that can easily be eliminated at a later stage, of the part to be produced. This model includes an internal part forming a ceramic core, which represents the cavities that one wants to see appear inside the blade. The wax model is then dipped several times in slurries consisting of a suspension of ceramic particles to make a shell mould, by carrying out so-called stuccoing and drying procedures.

The wax is then dewaxed and eliminated from the shell mould, which is a procedure by which the wax or the material constituting the original model is eliminated from the shell. After this elimination, a ceramic mould is obtained, whose cavity reproduces all the shapes of the blade and which still contains the ceramic core intended to generate the internal cavities thereof. The mould then undergoes a heat treatment, that is to say a "baking" at high temperature which gives it the necessary mechanical properties.

The shell mould is then ready for the manufacture of the metal part by casting. After checking the internal and external integrity of the shell mould, the following step consists in pouring a molten metal, which fills the gaps between the internal wall of the shell mould and the core, and then solidifying it. In the field of lost-wax casting, there currently are several solidifying techniques, thus several pouring techniques according to the nature of the alloy and to the expected properties of the part resulting from the casting. This can be directional solidification of columnar structure (DS), directional solidification of single crystals (SX) or equiaxed solidification (EX).

After casting the alloy, the shell is broken using a shake-out procedure. In another step, the ceramic core, which has remained enclosed in the blade obtained, is eliminated chemically. The metal blade obtained is then subjected to finishing procedures used to obtain the finished part.

Examples of how to produce turbine blades using the lost-wax casting technique are provided in the applicant's patent applications FR2875425 and FR2874186.

To form the wax model of the blade, a tooling outfit, or wax injection mould, is used in which the core is placed and then the liquid wax is injected through a channel provided for this purpose.

This core must be placed extremely precisely in the injection mould since any offset in its positioning will result in non-compliances in the blade wall thickness and the positioning of the internal cavities of the blade whose shape is that of the core. As the metal of the blade is subjected to very high temperatures, these defects would result in greatly reduced blade service lives. It is therefore necessary to ensure with great precision the place occupied by the core in the mould. To achieve this, the wax injection moulds that are currently used comprise means for supporting the core statically, these support means possibly comprising rods whose ends form fulcrums for supporting the core in the mould.

Though this type of positioning of the core proves to be effective, it nevertheless has limitations when the core is made up of several disjoint/independent elements assembled to each other in the mould. Indeed, the relative positioning as well as the maintenance of the various core elements must be made accurately without impacting the wax model which, it should be recalled, will form after casting the blade.

SUMMARY

The invention more particularly aims at providing a simple, efficient and cost-effective solution to the problems of the prior art disclosed above.

For this purpose, the invention proposes an assembly for manufacturing a wax moulding of a turbine engine blade comprising a wax injection mould in which a core is able to be mounted in a predetermined moulding position, the core extending in a longitudinal direction between a base and a head characterized in that the core comprises a main element and at least a first secondary element each including at least one functional part and a non-functional part, the non-functional part of the first element secondary device comprising a rod portion extending in a longitudinal direction of the blade and housed in a first slot of the non-functional part of the main element, the wax injection mould comprising a first internal boss for clamping said portion of rod in the bottom of the first slot.

According to the invention, the two core elements are held together by clamping a rod portion of the first secondary element of the core in a slot or longitudinal groove of the main core element. This assembly also allows the longitudinal thermal expansion of the first secondary element in relation to the main element, which allows to limit the deformations of the two elements in relation to each other and increases the accuracy of the blades made with the assembly according to the invention. Moreover, using non-functional parts of the core elements avoids having to modify its functional parts. Dimensioning these functional parts is indeed difficult to achieve and a modification of their shapes for any other reason than those related to the final shape of the blade is not desirable.

The term "functional" used with reference to the core makes it possible to indicate whether the part thus qualified makes it possible to achieve a face of the final geometry of the blade, that is to say, an external face such as an pressure of suction face, for example, or an inner face defining the cooling system of the blade. A non-functional part thus refers to an area of the core element that has no impact on the final geometry of the part.

In practice, the longitudinal direction also corresponds to a direction extending from the base of the blade to the top of the blade, this longitudinal direction being substantially perpendicular to the axis of rotation of the turbine engine.

According to another characteristic of the invention, the core comprises a second secondary element whose non-functional part also comprises a rod portion extending in the longitudinal direction of the blade and housed in a second slot of the non-functional part of, the main element, the mould comprising a second internal boss for clamping the said rod portion at the bottom of the second slot.

Preferably, the rod portions, the first and second slots and the first and second bosses are symmetrical to one another with respect to a longitudinally extending straight line.

In one embodiment of the invention, the boss or bosses comprise at least two longitudinal flanks converging towards each other with an inclination of these flanks facilitating stripping after wax injection from wax models surrounding the cores, on the one hand, and facilitating the shell shakeout procedures after casting the metal, on the other hand.

The flanks can be obliquely inclined at an angle between 10 and 30° with respect to a plane containing the longitudinal direction and a perpendicular direction to the longitudinal direction and passing between the two flanks.

The two flanks of each boss may be symmetrical to each other with respect to said plane.

In one embodiment of the invention, the boss(es) completely cover the slot or slots.

BRIEF DESCRIPTION OF THE DRAWINGS

The invention will be better understood, and other details, advantages and characteristics of the invention will appear upon reading the following description given by way of a non-restrictive example while referring to the following figures.

DETAILED DESCRIPTION

Figure 1:
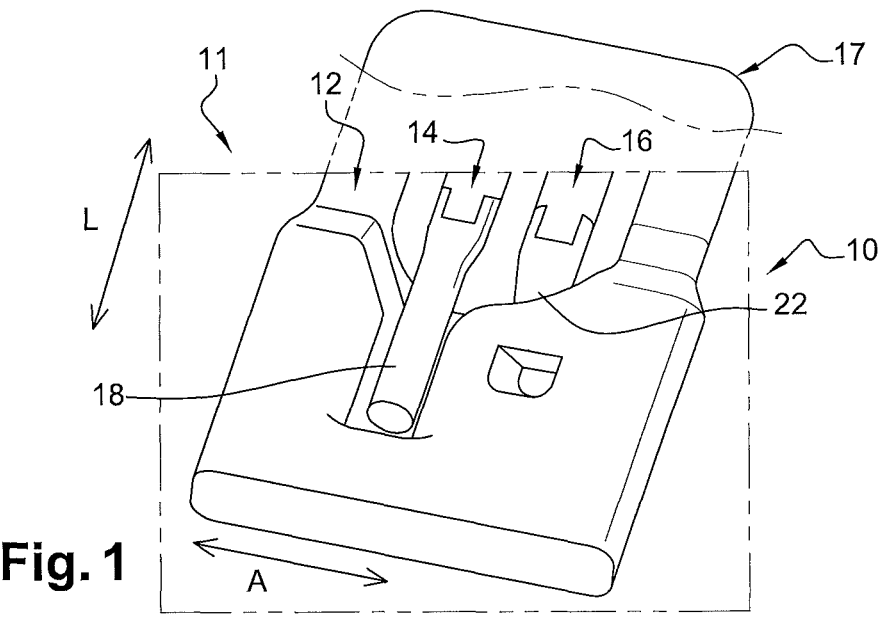
FIG. 1 is a diagrammatic perspective view of a lower end of a core.

First and foremost, reference is made to FIG. 1 showing a lower end or base of a core 10 comprising a main element 12 and two secondary elements, namely a first secondary element 14 and a second secondary element 16. FIG. 1 only shows the non-functional parts of the elements constituting the core 10, these non-functional parts being arranged at a longitudinal end of the core 10 (double arrow L). As mentioned above, a non-functional part of the core 10 is a part that is not involved in the final geometry of the part during the lost-wax casting process.

Figure 2:
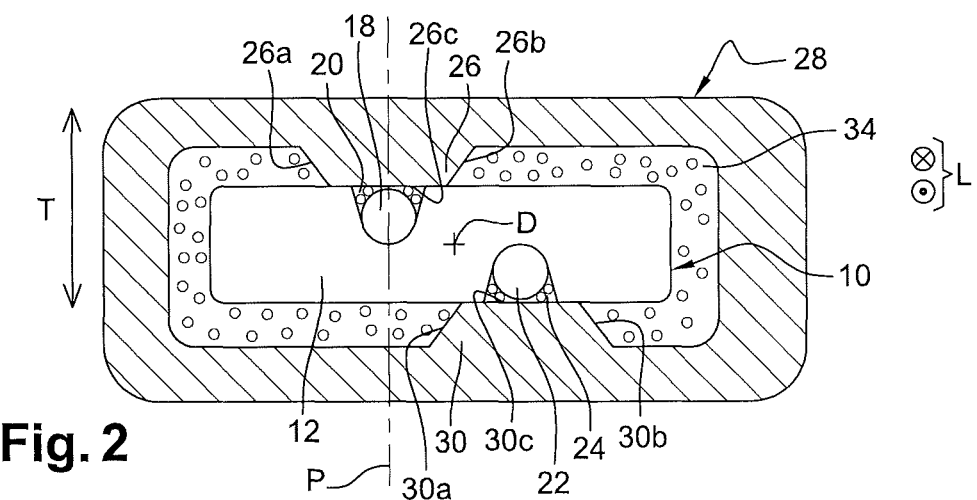
FIG. 2 is a diagrammatic sectional view along the section line AA of FIG. 1, the core being mounted in a wax injection mould.

The core 10 extends along three directions that are perpendicular two by two, one longitudinal direction L corresponding on the final blade to the longitudinal direction L connecting the base to the top of the blade, one axial direction A (FIG. 1) corresponding on the final blade to the upstream/downstream direction and one transverse direction T crossing the pressure and suction faces of the blade (FIG. 2). The core includes a head 17 on FIG. 1 and a base 11, which is shown alone in FIG. 1.

As is clearly visible, the first secondary element 14 comprises in its non-functional part a rod portion 18 extending substantially longitudinally and which is housed in a first slot 20 or substantially longitudinal groove of the non-functional part of the main element 12 (FIGS. 1 and 2). Similarly, the second secondary element 16 comprises in its non-functional part a rod portion 22 extending substantially longitudinally and which is housed in a second slot 24 or substantially longitudinal groove of the non-functional part of the main element 12 (FIGS. 1 and 2). The invention also covers embodiments in which the main element 12 of the core 10 comprises only one slot.

The main element 12 of the core 10 is intended to form in its functional part (not shown) a central cavity of the blade and the first and second secondary elements 14, 16 are intended to form in their functional parts (not shown) cavities whose function is to cool the pressure and suction walls of the blade.

The rod portions 18, 22 are arranged on either side of the non-functional part of the main element 12, the first and second slots 20, 24 thus opening in opposite directions of a substantially perpendicular direction (double arrow B in FIG. 2) in the longitudinal direction L.

As shown in FIG. 2, the wax injection mould comprises a first internal boss 26 formed on an internal face of the mould 28 and positioned so as to clamp the rod portion 18 of the first secondary element 14 of the core 10 in the first slot 20 of the main element 12 of the core 10. Similarly, the mould 28 comprises a second internal boss 30 formed on an inner face of the mould 28 and positioned to clamp the rod portion 22 of the second secondary member 16 of the core 10 in the second slot 24 of the main element 12 of the core 10. It should be noted that the first 26 and second 30 bosses are thus formed on faces facing the mould 28 and covers the outlets of the first 20 and second 24 slots.

Each boss 26, 30 comprises two longitudinal flanks 26a, 26b, 30a, 30b obliquely inclined with respect to each another, converging towards each another towards the inside of the mould 28 and connected to each other by a clamping wall 26c, 30c of a rod portion 18, 22, of a secondary element 14, 16 of the core 10 at the bottom of the slot 20, 24. Preferably, the flanks 26a, 26b, 30a, 30b are inclined at an angle of between 10 and 30° in relation to a plane containing the longitudinal direction L and the perpendicular direction T to the longitudinal direction and passing between the two flanks 26a, 26b, 30a, 30b.

Figure 3:
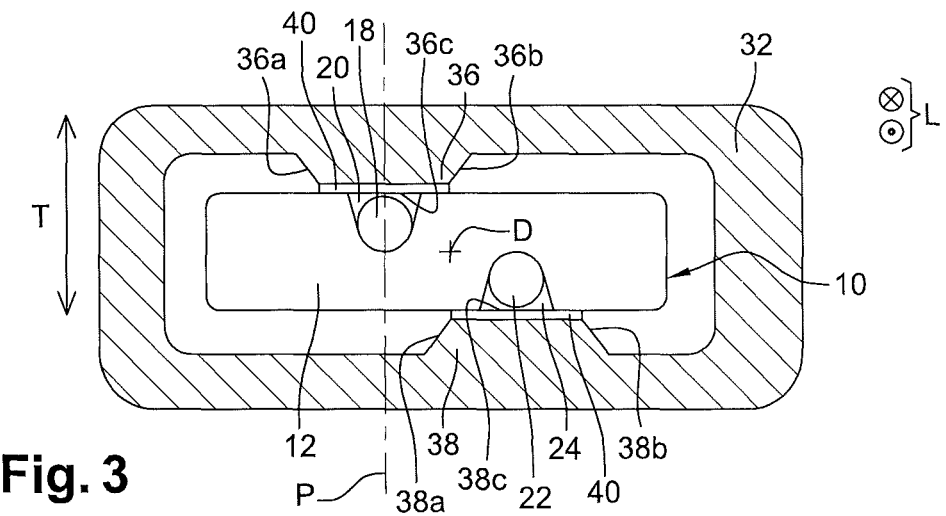
FIG. 3 is a diagrammatic sectional view along the section line AA of FIG. 1, the core being surrounded by a ceramic shell and the wax having been removed.

FIG. 3 shows the core 10 held in a ceramic shell mould 32. Indeed, after the wax 34 has been injected into the mould shown in FIG. 2, the wax blade model comprising the core 10 is covered with ceramic. It should thus be understood that the formation of bosses 26, 30 in the wax injection mould makes it possible to form similar bosses 36, 38 on the ceramic shell 32 and with inclined flanks 36a, 36b, 38a, 38b and a bearing face 36c, 38c that are identical to the flanks 26a, 26b, 30a, 30b as well as the bearing face 26c, 30c of the bosses 26, 30 of the wax injection mould 28. The shell thus makes it possible to maintain the assembly of the three elements 12, 14, 16 of the core in a non-functional part thereof, which avoids modifying the shape of the functional part of the core 10. The cooperation of portions of longitudinal rod 18, 22 of the first and second secondary members 14, 16 of the core 10 in longitudinal slots 20, 24 of the main element 12 of the core 10 allows the longitudinal thermal expansion of the elements in relation to each other.

The slots 20, 24 comprise a bottom with a substantially circular section corresponding to the circular section of the rod portions. Of course, other forms would also be possible without departing from the scope of the invention.

A varnish film 40 can be interposed between the rod 18, 22 of each of the non-functional part of the first secondary element 14 and the non-functional part of the second secondary element 16 and the wall 38c of the boss 38 facing each other. It should be understood that during the dewaxing and baking procedure of the shell mould, the varnish film will be eliminated resulting in the formation of a free space that forms a clearance between each of the first secondary element 14 and the second secondary element 16 and the shell mould 32. This free space forms a means of slidably retaining the non-functional second parts of the first 14 and second 16 secondary elements. The varnish film compensate for differential expansions of these two parts, this during the heating cycles of the shell mould and then casting.

The invention claimed is:

1. An assembly for manufacturing a wax moulding of a turbine engine blade comprising a wax injection mould in which a core can be mounted in a predetermined moulding position, the core extending in a longitudinal direction between a base and a head characterized in that the core comprises a main element and at least a first secondary element each with at least one functional part and a non-functional part, the non-functional part of the first secondary element comprising a rod portion extending in the longitudinal direction of the core and housed in a first slot of the non-functional part of the main element, the mould comprising a first internal boss for clamping said rod portion at the bottom of the first slot, the first internal boss comprising at least two longitudinal flanks converging towards each other and towards the inside of the mould.

2. An assembly for manufacturing a wax moulding of a turbine engine blade comprising a wax injection mould in which a core can be mounted in a predetermined moulding position, the core extending in a longitudinal direction between a base and a head characterized in that the core comprises a main element and at least a first secondary element each with at least one functional part and a non-functional part, the non-functional part of the first secondary element comprising a rod portion extending in the longitudinal direction of the core and housed in a first slot of the non-functional part of the main element, the mould comprising a first internal boss for clamping said rod portion at the bottom of the first slot, the first internal boss covering the slot in contact with said rod portion of the second secondary element in a perpendicular direction to the longitudinal direction.

3. A process for manufacturing a turbine engine blade using an assembly comprising a wax injection mould in which a core, intended to generate the internal cavities of the blade, can be mounted in a predetermined moulding position, the core extending in a longitudinal direction corresponding to a direction extending from between a base of the blade to and a head of the blade wherein the core comprises a main element and at least a first secondary element, each with at least one functional part and a non-functional part, the non-functional part of the first secondary element comprising a rod portion extending in the longitudinal direction of the core and housed in a first slot of the non-functional part of the main element, the mould further comprising a first internal boss for clamping said rod portion at a bottom of the first slot, the process comprising:

creating a model of a turbine blade made of wax using said mould, said model incorporating said core;
making a shell mould around said model;
eliminating the wax from the shell mould;
casting an alloy into the shell mould; and
chemically eliminating the core.

4. The process according to claim 3, wherein the core comprises a second secondary element with at least one functional part and a non-functional part, wherein the non-functional part comprises a rod portion extending in the longitudinal direction and housed in a second slot of the non-functional part of the main element, the mould further comprising a second internal boss clamping said rod portion at a bottom of the second slot.

5. The process according to claim 4, wherein the rod portions, the first and second slots, and the first and second bosses are symmetrical to each other in relation to a straight line extending longitudinally.

6. The process according to claim 4, wherein at least one boss comprises at least two longitudinal flanks converging towards each other and towards the inside of the mould.

7. The process according to claim 6, wherein the at least two longitudinal flanks are inclined obliquely by an angle of between 10 and 30 degrees in relation to a plane containing the longitudinal direction and a direction perpendicular to the longitudinal direction and passing between the at least two longitudinal flanks.

8. The process according to claim 7, wherein the at least two longitudinal flanks of each boss are symmetrical to each other with respect to said plane.

9. The process according to claim 4, wherein at least one boss covers at least one of the first and second slots in contact with said rod portion of the second secondary element in a direction perpendicular to the longitudinal direction.

* * * * *